United States Patent
Yamamoto et al.

(10) Patent No.: US 9,396,844 B2
(45) Date of Patent: Jul. 19, 2016

(54) WIRE HARNESS MANUFACTURING DEVICE

(71) Applicant: YAZAKI CORPORATION, Tokyo (JP)

(72) Inventors: Masataka Yamamoto, Kosai (JP); Takehiko Uehara, Kosai (JP); Yoshihiro Murakami, Kosai (JP); Masahiro Sora, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 321 days.

(21) Appl. No.: 13/912,628

(22) Filed: Jun. 7, 2013

(65) Prior Publication Data

US 2013/0269182 A1    Oct. 17, 2013

Related U.S. Application Data

(63) Continuation of application No. PCT/JP2011/079129, filed on Dec. 9, 2011.

(30) Foreign Application Priority Data

Dec. 10, 2010  (JP) ................................ 2010-275469

(51) Int. Cl.
*H01B 13/012* (2006.01)
*B60R 16/02* (2006.01)

(52) U.S. Cl.
CPC .......... *H01B 13/012* (2013.01); *B60R 16/0207* (2013.01); *H01B 13/01227* (2013.01); *Y10T 29/49117* (2015.01); *Y10T 29/53243* (2015.01)

(58) Field of Classification Search
CPC .......... H01R 9/226; H01R 13/52; H02G 3/08; H02G 3/16; B60R 16/0207; H01B 13/012; H01B 13/01227; Y10T 29/49117; Y10T 29/53243
See application file for complete search history.

(56) References Cited

U.S. PATENT DOCUMENTS

| 5,526,562 A | 6/1996 | Kita et al. |
| 2001/0019478 A1 | 9/2001 | Izumi et al. |

FOREIGN PATENT DOCUMENTS

| CN | 2648560 Y | 10/2004 |
| CN | 101465181 A | 6/2009 |
| CN | 201570301 U | 9/2010 |
| EP | 1630827 A1 | 3/2006 |
| GB | 2 276 602 A | 5/1994 |
| JP | 6006927 A * | 1/1994 |
| JP | 6006928 A * | 1/1994 |
| JP | 7059130 B * | 6/1995 |

(Continued)

OTHER PUBLICATIONS

Office Action dated Nov. 13, 2014 issued by Federal Service for Intellectual Property in counterpart Russian Application No. 2013131770.

(Continued)

*Primary Examiner* — Carl Arbes
(74) *Attorney, Agent, or Firm* — Sughrue Mion, PLLC

(57) ABSTRACT

To reduce the total stock of external parts in an assembling factory of a wire harness and to provide a wire harness manufacturing device including a wiring board that wires a plurality of electric wires and a molding machine that forms external parts attached to the plurality of electric wires in the assembling factory of the wire harness, a wire harness manufacturing device 1 includes a molding machine 2 that forms external parts 31, 32, 33, 35 and 44 attached to a wire harness 20 and a wiring board 3 having a binding device that wires a plurality of electric wires 40 to a prescribed form.

4 Claims, 7 Drawing Sheets

(56) References Cited

FOREIGN PATENT DOCUMENTS

| JP | 9-141529 A | 6/1997 |
|---|---|---|
| JP | 2876892 B2 * | 3/1999 |
| JP | 2001-283657 A | 10/2001 |
| JP | 2002-245876 A | 8/2002 |
| JP | 2004-356021 A | 12/2004 |
| JP | 2005-294132 A | 10/2005 |

OTHER PUBLICATIONS

Communication issued on Jan. 28, 2015 by the State Intellectual Property Office of the P.R. of China in related application 201180059960.X.

Office Action dated Mar. 17, 2015 issued by Japanese Patent Office in counterpart Japanese Patent Application No. 2010-275469.

International Search Report dated Mar. 20, 2012 issued in International Application No. PCT/JP2011/079129 (PCT/ISA/210).

Written Opinion dated Mar. 20, 2012 issued in International Application No. PCT/JP2011/079129 (PCT/ISA/237).

Office Action dated Jul. 10, 2014, issued by the Japanese Patent Office in counterpart Japanese Application No. 2010-275469.

Office Action issued Sep. 21, 2015, issued by the State Intellectual Property Office of the People's Republic of China in counterpart Chinese Patent Application No. 201180059960.X.

* cited by examiner

WIRE HARNESS MANUFACTURING DEVICE

CROSS REFERENCE TO RELATED APPLICATION

This application is a continuation of PCT application No. PCT/JP2011/079129, which was filed on Dec. 9, 2011 based on Japanese Patent Application (No. 2010-275469) filed on Dec. 10, 2010, the contents of which are incorporated herein by reference. Also, all the references cited herein are incorporated as a whole.

BACKGROUND OF THE INVENTION

1. Field of the Invention

The present invention relates to a manufacturing device for manufacturing a wire harness provided in a motor vehicle.

2. Description of the Related Art

Various kinds of electronic devices are mounted on a motor vehicle. In the motor vehicle, a wire harness is provided to supply an electric power from a power source such as a battery or a control signal from a controller to the electronic devices.

The wire harness includes a main harness and external parts attached to the main harness. The main harness includes a sub-harness which is formed by bundling a plurality of electric wires having a connector provided in terminals.

The wire harness is assembled in a factory, as shown in FIG. 8, by a wire harness manufacturing device 100 including a belt conveyor 101 having a continuously circulating travel belt and working benches 102 transported by the belt conveyor 101 (for instance, see JP-A-9-141529).

In the wire harness manufacturing device 100, parts boxes 103 are provided in the vicinity of the wire harness manufacturing device 100 that store the external parts such as grommets for the wire harness attached to the sub-harness or the main harness, protectors for the wire harness, wiring clips or the like. An operation of the wire harness manufacturing device is prevented from stopping due to the shortage of the external parts by the stock stored in the parts boxes 103.

However, in the wire harness manufacturing device 100 disclosed in the JP-A-9-141529, when the external parts to be attached to the sub-harness are insufficient, the wire harness cannot be manufactured. Therefore, the parts boxes 103 that store many stocks of the external parts need to be installed in the vicinity of the wire harness manufacturing device 1. Further, since the external parts are respectively attached to the working benches 102 of the wire harness manufacturing device 100, the parts box 103 is installed for each of the working benches 102. Accordingly, an installed area of the wire harness manufacturing device 100 is increased, so that a wide working space needs to be ensured in the factory.

Further, since the external parts are essentially required to manufacture the wire harness, relatively many external parts are stored in a storehouse as the stocks. Accordingly, a space for accommodating the stocks of the external parts needs to be ensured and a management of the stocks is necessary.

SUMMARY OF THE INVENTION

It is an object of the present invention to reduce the total stock of external parts in an assembling factory of a wire harness and to provide a wire harness manufacturing device including a wiring board that wires a plurality of electric wires and a molding machine that forms external parts to be attached to the plurality of electric wires in the assembling factory of the wire harness.

In order to achieve the above-described object, according to the present invention, a manufacturing device for manufacturing a wire harness is provided that includes a molding machine that forms an external part to be attached to the wire harness, and a wiring board having a binding device that wires a plurality of electric wires to a prescribed form.

Also, in order to achieve the above-described object, according to the present invention, a wire harness manufacturing method that manufactures a wire harness by a wire harness manufacturing device, the wire harness manufacturing method comprises forming an external part to be attached to the wire harness by a molding machine, wiring a plurality of electric wires to a prescribed form, in a wiring board, wherein the molding machine is included in the wire harness manufacturing device.

According to the present invention, in the wire harness manufacturing device and the wire harness manufacturing method, the plurality of electric wires are provided and formed in the prescribed forms and the external parts attached to the wire harness are formed. Accordingly, in a wire harness factory, only the required number of external parts is manufactured when the external parts are necessary. Therefore, a space for storing the stocks of the external parts is omitted to save a labor and time required for management of the stocks of the external parts.

BRIEF DESCRIPTION OF THE DRAWINGS

FIG. 3(A) shows a metal mold that forms a clip and FIG. 3(B) shows a metal mold that forms an electric wire having an external parts.

DESCRIPTION OF THE PREFERRED EMBODIMENTS

Now, embodiments of the present invention will be described below by referring to FIG. 1 to FIG. 7.

First Embodiment

Figure 1:
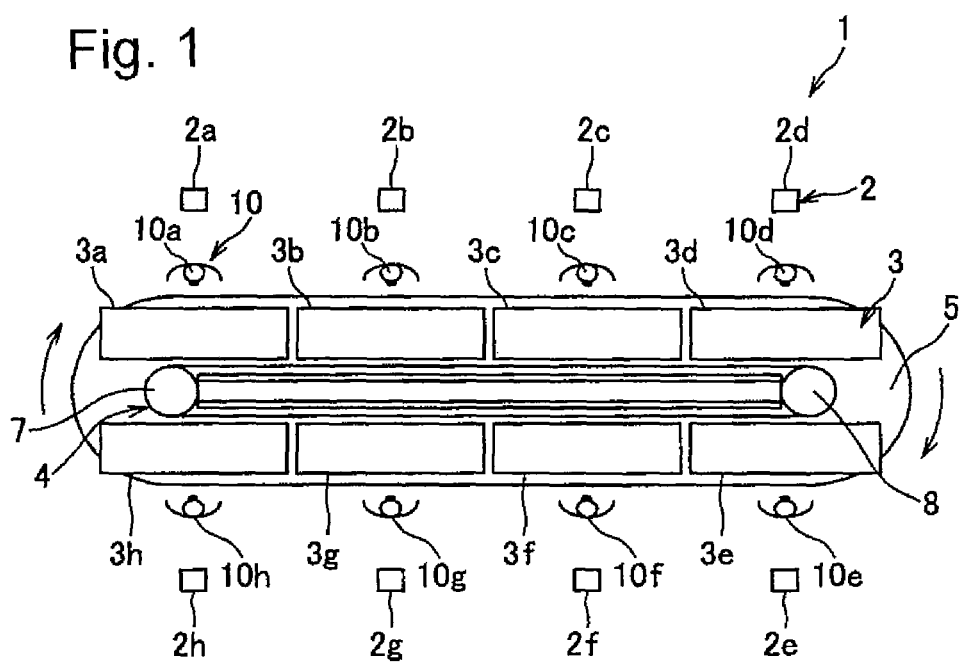
FIG. 1 is a view showing an embodiment of a wire harness manufacturing device according to the present invention.

FIG. 1 shows a wire harness manufacturing device 1 according to the present invention. The wire harness manufacturing device 1 manufactures a wire harness 20 shown in FIG. 4.

The wire harness 20 includes a main harness 21 and external parts attached to the main harness 21 such as wiring clips 31, protectors 32 for the wire harness, grommets 33 for the wire harness or tubes 35 for the wire harness.

In the main harness 21, a plurality of sub-harnesses 22 are fixed by winding tapes 38 thereon. In the sub-harness, a bundle of electric wires 49 is fixed by winding the tape 38 thereon. The bundle of electric wires 49 is formed by a plurality of electric wires 40. The electric wires 40 have connectors 41 provided in terminals.

The electric wire 40 includes an electrically conductive core wire and an insulating coating part. The core wire is formed by twisting a plurality of conductors. The conductors forming the core wire are made of electrically conductive metal. Further, the core wire may be formed with one conductor. The coating part is formed with a synthetic resin, for instance, a polyvinyl chloride resin. The core wire is coated with the coating part.

The connector 41 includes terminal fittings electrically connected to the core wires of the electric wires 40 and an insulating connector housing for accommodating the terminal fittings. The terminal fittings are made of an electrically conductive thin plate and attached to end parts of the electric wires 40 to be electrically connected to the core wires of the electric wires 40. The connector housing is made of an insulating synthetic resin and formed in the shape of a box.

The manufacturing device 1 for manufacturing the wire harness 20 includes, as shown in FIG. 1, molding machines 2 that form the external parts, wiring boards 3 that lay a plurality of electric wires, a belt conveyor 4 having a travel belt for circulating the wiring boards 3 along a travel passage 5. In a description of the present embodiment, the wiring boards 3 of the manufacturing device 1 are circulated by the belt conveyor 4, however, the wiring boards 3 may be moved in one direction. Otherwise, what is called a cell production may be used in which one or a few workers assemble the wire harness for one wiring board 3.

The wiring board 3 has a frame not shown in the drawing and is provided on a floor of a factory. The frame is provided with wheels so as to travel on the floor. A plurality of wiring boards 3 are arranged respectively correspondingly to processes of a process of a downstream side from a process of an upstream side. The plurality of wiring boards 3a to 3h are transported by the belt conveyor 4 (precisely, the travel belt) to travel on the prescribed travel passage 5.

The wiring boards 3a to 3h have upper surfaces formed in the shapes of flat tables and patterns showing the external parts 31, 32, 33 and 35 or wiring patterns of the electric wires 40 are drawn thereon. On the wiring boards 3a to 3h, binding devices not shown in the drawing are planted along the wiring patterns. The binding devices are formed in the shapes of U and can bind the electric wires 40.

The belt conveyor 4 includes a ring shaped and endless shaped travel belt and one pair of pulleys 7 and 8 and is arranged along the travel passage 5 provided on the floor of the factory. To one pulley 7, a driving shaft of a driving motor is directly connected. The other pulley 8 freely rotates. The travel belt is circulated by a rotating and driving force of the driving motor to transport the wiring boards 3a to 3h. In this case, the driving motor repeatedly travels and stops in accordance with a prescribed tact to transport the wiring boards 3a to 3h. The wiring boards 3a to 3h are provided with buttons for stopping or operating the belt conveyor 4 in accordance with the progress of a work.

Figure 2:
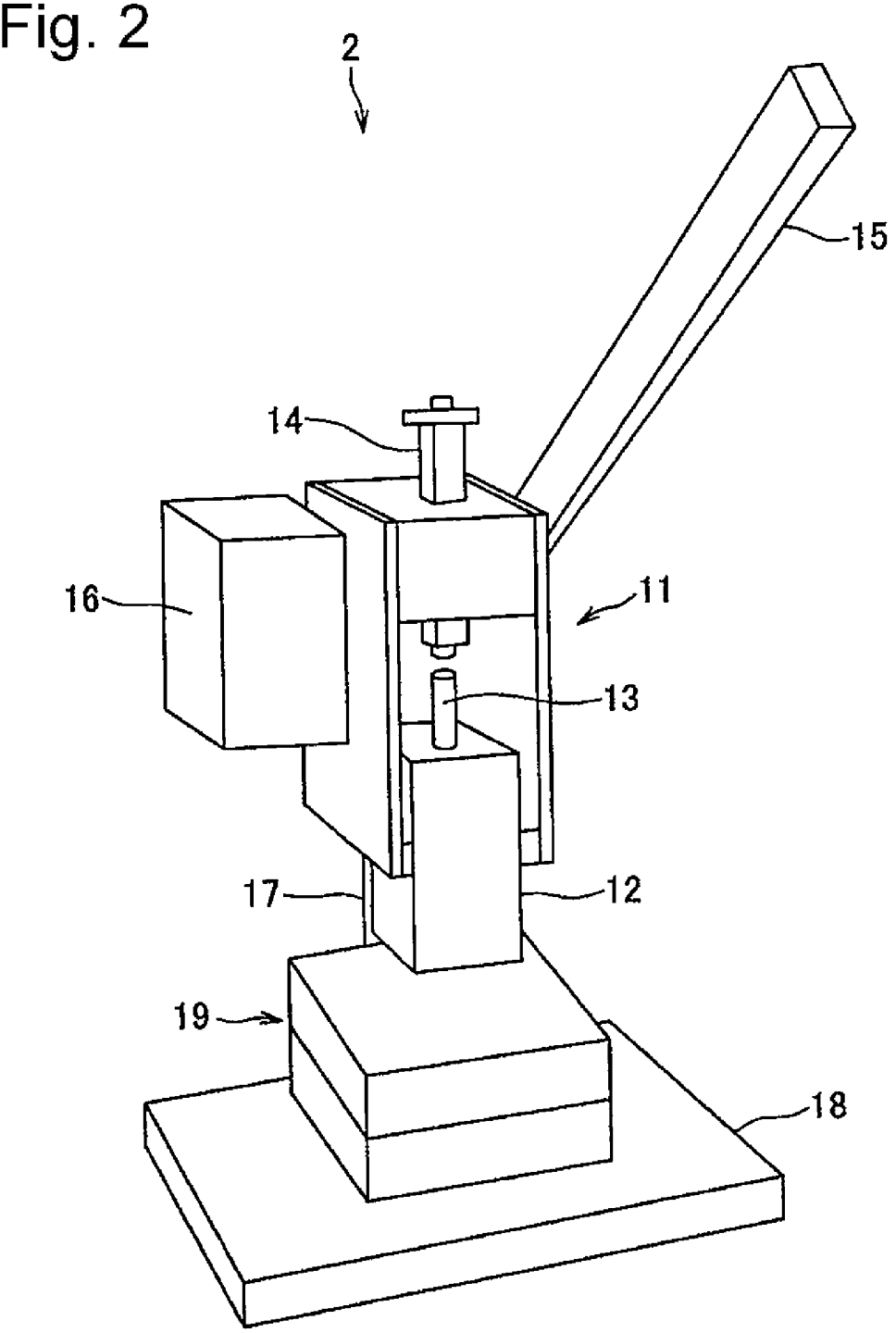
FIG. 2 is a perspective view showing a molding machine that forms the wire harness manufacturing device shown in FIG. 1.

A plurality of molding machines 2 are arranged correspondingly to the plurality of arranged wiring boards 3a to 3h as shown in FIG. 1. The molding machine 2 is a micro molding machine that can be operated by an operator without an external power such as an electric motor, and includes, as shown in FIG. 2, a metal mold 19, a closing device not shown in the drawing and an injection molding machine 11 that pressurizes and injects molten resin to the metal mold 19. The injection molding machine 11 includes a heating tube 12 provided with a heater that heats a synthetic resin such as polypropylene to be molten, a plunger 13 that injects the molten resin in the heating tube 12 from a nozzle not shown in the drawing, an injection cylinder 14 that moves the plunger 13 forward, a handle 15 that drives the injection cylinder 14 and a temperature controller 16 that holds a heating temperature of the heating tube 12 at a desired temperature. These members are supported by a strut 17 standing upright on a pedestal 18.

The micro molding machine mentioned in the present invention indicates a molding machine in which a quantity of resin to be molded by an injection molding for each time is 10g at its maximum and the metal mold 19 can be manually closed by using an air cylinder or a link during a closing operation of the metal mold 19. Accordingly, in the injection molding machine 11 as the micro molding machine, the injection cylinder 14 may be driven by the external power such as the electric motor or air.

Figure 3A:
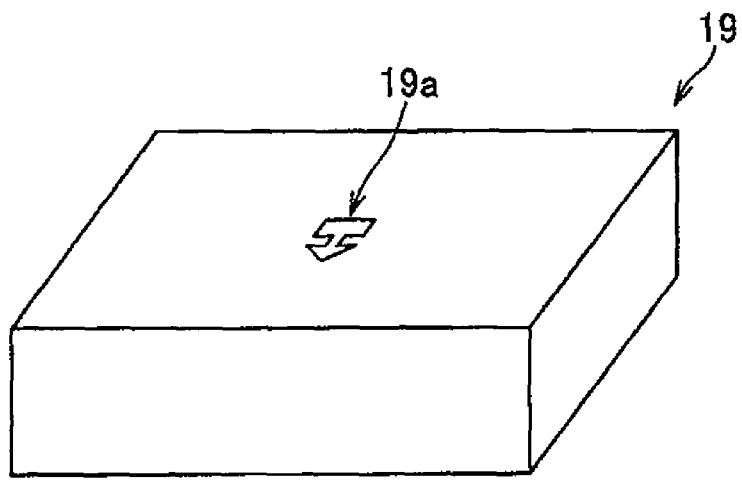
FIGS. 3(A) and 3(B) are perspective views of a mold that forms the molding machine shown in FIG. 2.

The metal mold 19 is a horizontally split metal mold. In a lower mold of the metal mold 19, as shown in FIG. 3(A), a surface of the metal mold 19 is directed upward. On the surface, an external part cavity 19a is provided that is formed along an outline of the wiring clip 31 of the external parts. A capacity of the external parts cavity 19a is set to several cm$^3$ when the metal mold 19 is closed. Further, the external parts cavity 19a may form the external parts such as the protector 32 for the wire harness, the grommet 33 for the wire harness or the tube 35 for the wire harness. In the present embodiment, the metal mold 19 is described as the horizontally split metal mold, however, the metal mold 19 may be a vertically split metal mold.

In the manufacturing device 1 of the wire harness formed as described above, as shown in FIG. 1, a plurality of operators 10 are respectively arranged correspondingly to working processes from the upstream side to the downstream side. The plurality of operators 10a to 10h carry out works respectively assigned to them at the same time. The plurality of operators 10a to 10d, are engaged in a wiring work. The operators 10e to 10h of them are engaged in a tape winding work. The wiring work includes a forming work of the wiring clips 31 by the molding machines 2 and an attaching work of the wiring clips 31. The travel belt of the belt conveyor 4 rotates clockwise. The wiring work is carried out by the operators 10a to 10d, and then, the tape winding work is carried out by the operators 10e to 10h.

Specifically, in the wiring board 3a, the plurality of electric wires 40 are wired on the wiring board 3a by the operator 10a in accordance with a prescribed wiring pattern and a prescribed assembling order. Then, the metal mold 19 forming the molding machine 2a is closed. The molten resin is pressurized and injected to the external parts cavity 19a of the metal mold 19 by the injection molding machine 11 to form the wiring clip 31 having an engaging part that can be engaged with a hole of a panel of a motor vehicle in which the wire harness 20 is arranged and a belt part for binding the plurality of electric wires. Then, the plurality of wired electric wires 40 are bound by the band part of the clip part 31 to attach the wiring clip 31 to the bound electric wires.

Subsequently, in the wiring board 3b, the plurality of electric wires 40 are wired on the wiring board 3b by the operator 10b in accordance with a prescribed wiring pattern and a prescribed assembling order. Then, the metal mold 19 forming the molding machine 2b is closed. The molten resin is pressurized and injected to the external parts cavity 19a of the metal mold 19 by the injection molding machine 11 to form the wiring clip 31. Then, the plurality of wired electric wires 40 are bound by the band part of the clip part 31 to attach the wiring clip 31 to the bound electric wires.

Subsequently, in the wiring board 3c, the plurality of electric wires 40 are wired on the wiring board 3c by the operator 10c in accordance with a prescribed wiring pattern and a prescribed assembling order. Then, the metal mold 19 forming the molding machine 2c is closed. The molten resin is pressurized and injected to the external parts cavity 19a of the metal mold 19 by the injection molding machine 11 to form the wiring clip 31. Then, the plurality of wired electric wires 40 are bound by the band part of the clip part 31 to attach the wiring clip 31 to the bound electric wires.

Subsequently, in the wiring board 3d, the plurality of electric wires 40 are wired on the wiring board 3d by the operator 10d in accordance with a prescribed wiring pattern and a prescribed assembling order. Then, the metal mold 19 forming the molding machine 2d is closed. The molten resin is pressurized and injected to the external parts cavity 19a of the metal mold 19 by the injection molding machine 11 to form the wiring clip 31. Then, the plurality of wired electric wires 40 are bound by the band part of the clip part 31 to attach the wiring clip 31 to the bound electric wires.

Subsequently, in the wiring board 3e, a vinyl tape 38 is wound on the periphery of the plurality of electric wires 40 that are wired in a prescribed form and bound by the band part of the wiring clip 31 by the operator 10e to form the sub-harness 22.

Subsequently, in the wiring board 3f, a vinyl tape 38 is wound on the periphery of the plurality of electric wires 40 that are wired in a prescribed form and bound by the band part of the wiring clip 31 by the operator 10f to form the sub-harness 22.

Subsequently, in the wiring board 3g, a vinyl tape 38 is wound on the periphery of the plurality of electric wires 40 that are wired in a prescribed form and bound by the band part of the wiring clip 31 by the operator 10g to form the sub-harness 22.

Subsequently, in the wiring board 3h, a vinyl tape 38 is wound on the peripheries of the plurality of sub-harnesses 22 formed in the wiring boards 3e to 3g by the operator 10h to form the main harness. Then, the external parts such as the wiring clips 31, the tubes 35 for the wire harness, the grommets 33 for the wire harness or the protectors 32 for the wire harness are formed by the molding machine 2h and attached to prescribed positions of the main harness to form the wire harness 20. The wire harness 20 is detached from the wiring board 3h by the operator 10h and fed to a process for inspection of an external appearance or a process for inspection of a circuit.

As described above, the manufacturing device 1 of the wire harness of the present embodiment includes the molding machines 2 that form the external parts such as the wiring clips 31, the protectors 32 for the wire harness, the grommets 33 for the wire harness or the tubes 35 for the wire harness, which are attached to the wire harness 20, the wiring boards 3 having the binding devices that lay the plurality of electric wires 40 to prescribed forms and the belt conveyor 4 that circulates the wiring boards 3.

Accordingly, in the manufacturing device 1 of the wire harness, the plurality of electric wires 40 are provided or wired to the prescribed forms and the external parts such as the wiring clips 31 attached to the wire harness 20 are formed. Therefore, in an overseas wire harness factory where the external parts cannot be locally procured, the wire harness 20 can be manufactured without externally supplying the external parts. Thus, a large quantity of the stocks of the external parts does not need to be stored.

Further, the molding machine 2 includes the metal mold 19 and the injection molding machine 11. The injection molding machine 11 is a vertical injection molding machine.

Accordingly, an installed area of the injection molding machine 11 is about 20 to 30% as large as that of a horizontal injection molding machine to make the manufacturing device 1 of the wire harness compact. Therefore, in a floor of a wire harness factory, the manufacturing device 1 of the wire harness is installed with a sufficient room. Further, since the injection molding machine 11 is the micro molding machine that can be operated by an operator without an external power such as an electric motor, the injection molding machine is easily handled to improve a working efficiency.

Second Embodiment

Figure 5:
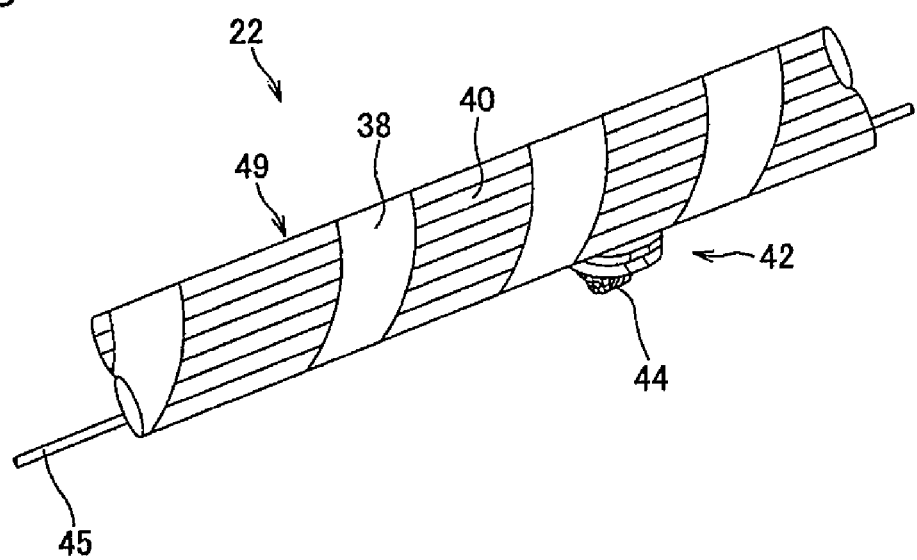
FIG. 5 is a perspective view of a sub-harness that forms the wire harness shown in FIG. 4.

According to this embodiment, in a manufacturing device 1 of a wire harness, as shown in FIG. 5, an electric wire 42 with an external parts in which a wiring clip 44 that is an external parts is provided in an electric wire 45 is attached to a sub-harness 22 forming a wire harness 20. The external parts may be a protector 32 for the wire harness, a grommet 33 for the wire harness or a tube 35 for the wire harness.

Figure 6:
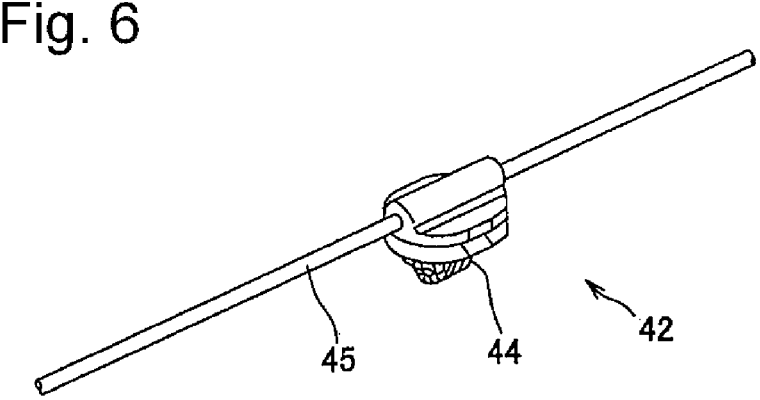
FIG. 6 is a perspective view of the electric wire having the external parts that forms the sub-harness shown in FIG. 5.
Figure 7:
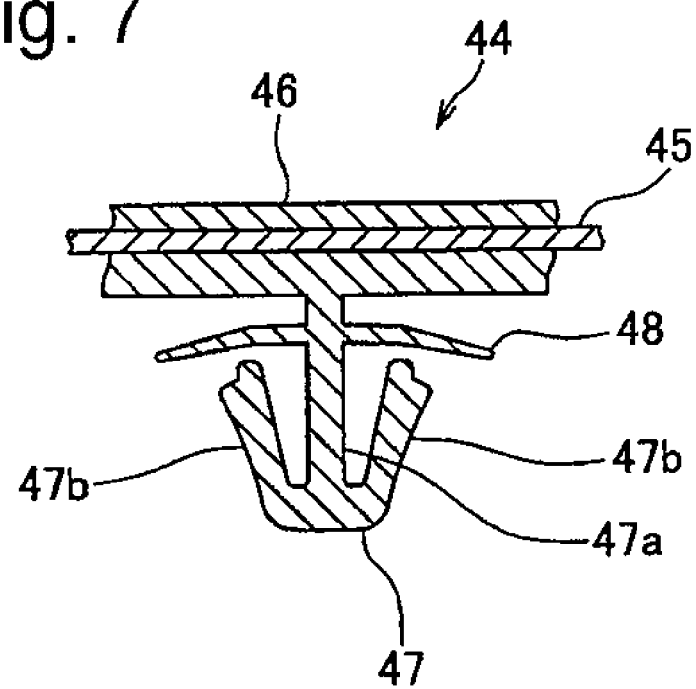
FIG. 7 is a sectional view of a clip that forms the electric wire having the external parts shown in FIG. 6.
Figure 8:
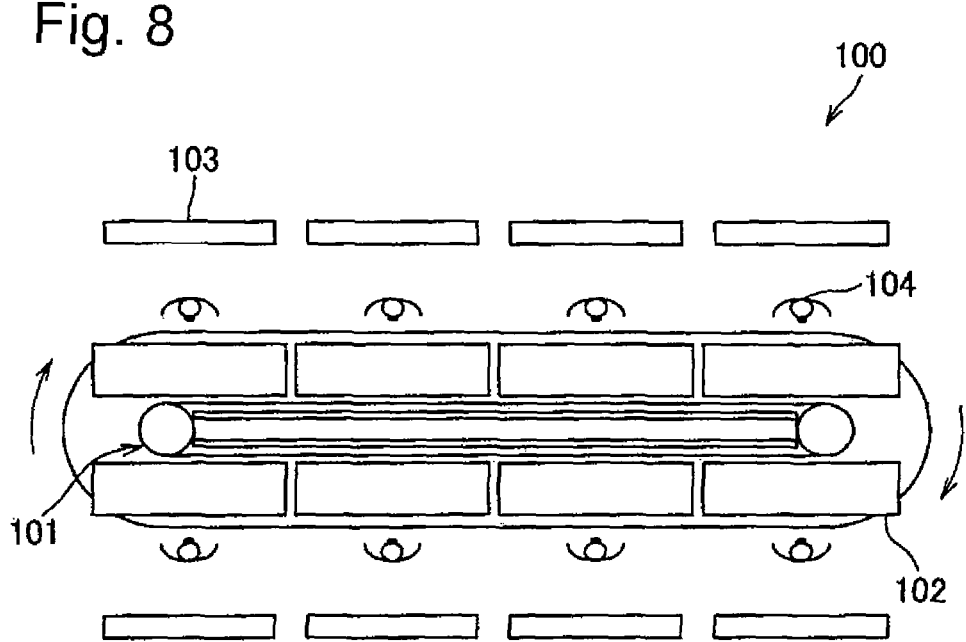
FIG. 8 is a view showing a usual wire harness manufacturing device.

The electric wire 42 with the external parts includes, as shown in FIG. 6, the electric wire 45 and the wiring clip 44 formed integrally with the electric wire 45. The wiring clip 44 includes, as shown in FIG. 7, a main body 46 fixed to the electric wire 45, an engaging part 47 which stands upright from the main body 46 and can be engaged with a hole of a panel of a motor vehicle in which the wire harness 20 is provided and a holding part 48 that presses the panel when the engaging part 47 is engaged with the hole to hold the engaging part 47 in an engaged state with the hole. Further, the wiring clip 44 may be provided with a band part.

The wiring clip 44 is formed with a synthetic resin having flexibility such as polypropylene. The engaging part 47 of the wiring clip 44 includes a strut 47a standing upright from the main body and a pair of engaging pieces 47b. The strut 47a is extended along a direction orthogonal to the surface of the main body 46. The one pair of engaging pieces 47b are extended from an end of the strut 47a to a base end side and inclined so as to be gradually separated from each other as they go to the base end side.

When the engaging part 47 of the wiring clip 44 enters the hole of the panel, free ends of the one pair of engaging pieces 47b are temporarily elastically deformed so that the free ends respectively come close to each other. Then, when the engaging part 47 is inserted into the hole, the free ends of the one pair of engaging pieces 47b are respectively displaced so as to be separated from each other due to an elastically restoring force. Then, the free ends of the one pair of engaging pieces 47 respectively abut on the peripheral edge of the hole, so that the engaging part 47 is engaged with the hole. At this time, the outer edge part of the holding part 48 presses the surface of the panel to improve an engaging force of the engaging part 47 and the hole.

Figure 3B:
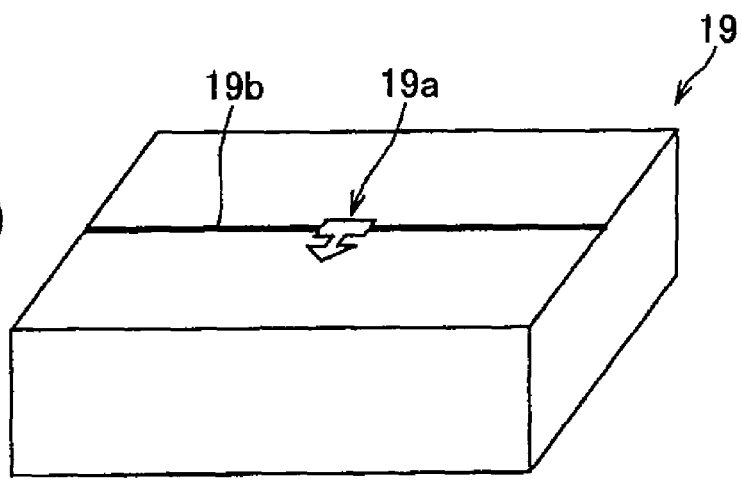
Figure 4:
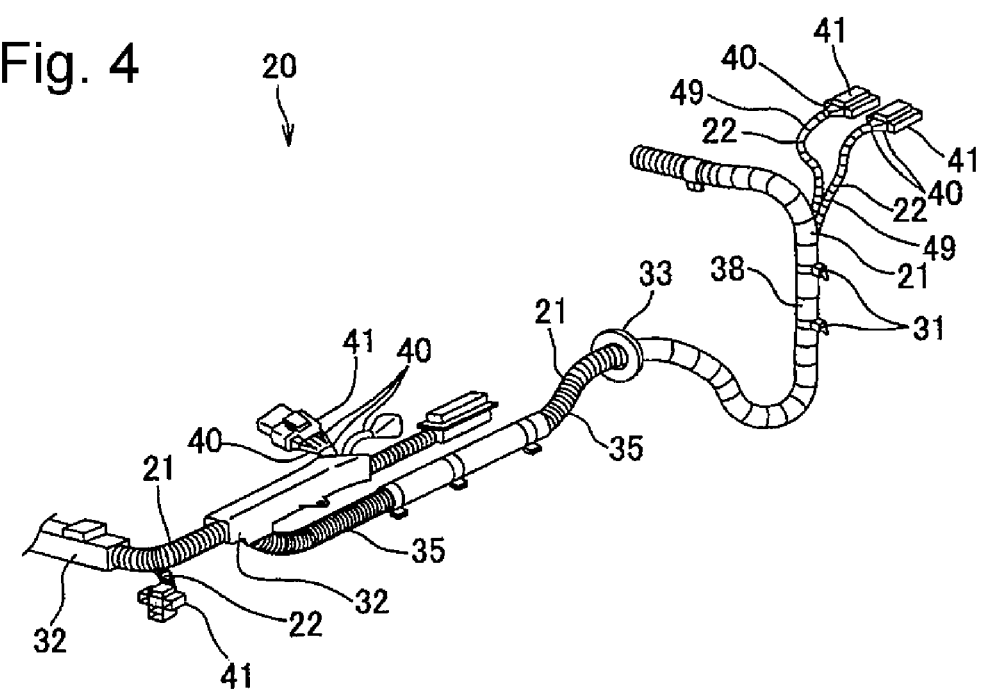
FIG. 4 is a perspective view of a wire harness manufactured by the wire harness manufacturing device shown in FIG. 1.

A metal mold 19 of a molding machine 2 forming the manufacturing device 1 of the wire harness is a horizontally split metal mold. As shown in FIG. 3(B), a surface of a lower mold of the metal mold 19 is directed upward. On the surface, are provided a filament cavity 19b formed along an outline of the electric wire 45 and an external parts cavity 19a formed on the filament cavity 19b and along an outline of the wiring clip 44 attached to the electric wire 45. The filament cavity 19b is formed so as to communicate with an external part from both ends of the metal mold 19. The external parts cavity 19a is formed so as to communicate with the filament cavity 19b. Accordingly, the electric wire 45 is easily accommodated in the filament cavity 19b.

In the manufacturing device 1 of the wire harness, as shown in FIG. 1, a plurality of operators 10 are respectively arranged correspondingly to working processes from the upstream side to the downstream side. The plurality of operators 10a to 10h carry out works respectively assigned to them at the same time. The plurality of operators 10a to 10d, are engaged in a wiring work. The operators 10e to 10h of them are engaged in a tape winding work. The wiring work includes a forming work of the electric wire 42 with the external parts by the molding machines 2 and an attaching work of the electric wire 42 with the external parts. A travel belt of a belt conveyor 4 rotates clockwise. The wiring work is carried out by the operators 10a to 10d, and then, the tape winding work is carried out by the operators 10e to 10h.

Specifically, in a wiring board 3a, a plurality of electric wires 40 are wired on the wiring board 3a by the operator 10a in accordance with a prescribed wiring pattern and a prescribed assembling order. Then, the electric wire 45 is accommodated in the filament cavity 19b of the metal mold 19 forming the molding machine 2a and the metal mold 19 is closed. A molten resin is pressurized and injected to the external parts cavity 19a of the metal mold 19 by an injection molding machine 11 to form the electric wire 42 with the external parts. Then, the electric wire 42 with the external parts is wired along the plurality of electric wires 40 wired as described above.

Subsequently, in a wiring board 3b, a plurality of electric wires 40 are wired on a wiring board 3b by the operator 10b in accordance with a prescribed wiring pattern and a prescribed assembling order. Then, the electric wire 45 is accommodated in the filament cavity 19b of the metal mold 19 forming the molding machine 2b and the metal mold 19 is closed. A molten resin is pressurized and injected to the external parts cavity 19a of the metal mold 19 by an injection molding machine 11 to form the electric wire 42 with the external parts. Then, the electric wire 42 with the external parts is wired along the plurality of electric wires 40 wired as described above.

Subsequently, in a wiring board 3c, a plurality of electric wires 40 are wired on the wiring board 3c by the operator 10c in accordance with a prescribed wiring pattern and a prescribed assembling order. Then, the electric wire 45 is accommodated in the filament cavity 19b of the metal mold 19 forming the molding machine 2c and the metal mold 19 is closed. A molten resin is pressurized and injected to the external parts cavity 19a of the metal mold 19 by an injection molding machine 11 to form the electric wire 42 with the external parts. Then, the electric wire 42 with the external parts is wired along the plurality of electric wires 40 wired as described above.

Subsequently, in a wiring board 3d, a plurality of electric wires 40 are wired on the wiring board 3d by the operator 10d in accordance with a prescribed wiring pattern and a prescribed assembling order. Then, the electric wire 45 is accommodated in the filament cavity 19b of the metal mold 19 forming the molding machine 2d and the metal mold 19 is closed. A molten resin is pressurized and injected to the external parts cavity 19a of the metal mold 19 by an injection molding machine 11 to form the electric wire 42 with the external parts. Then, the electric wire 42 with the external parts is wired along the plurality of electric wires 40 wired as described above.

Subsequently, in a wiring board 3e, a vinyl tape 38 is wound, by the operator 10e, on the peripheries of the plurality of electric wires 40 wired to a prescribed form and the electric wire 45 forming the electric wire 42 with the external parts wired along the plurality of electric wires 40 to form the sub-harness 22.

Subsequently, in a wiring board 3f, a vinyl tape 38 is wound, by the operator 10f, on the peripheries of the plurality of electric wires 40 wired to a prescribed form and the electric wire 45 forming the electric wire 42 with the external parts wired along the plurality of electric wires 40 to form the sub-harness 22.

Subsequently, in a wiring board 3g, a vinyl tape 38 is wound, by the operator 10g, on the peripheries of the plurality of electric wires 40 wired to a prescribed form and the electric wire 45 forming the electric wire 42 with the external parts wired along the plurality of electric wires 40 to form the sub-harness 22.

Subsequently, in a wiring board 3h, a vinyl tape 38 is wound on the peripheries of the plurality of sub-harnesses 22 formed in the wiring boards 3e to 3g by the operator 10h to form the main harness. Then, the external parts such as the wiring clips 31, the tubes 35 for the wire harness, the grommets 33 for the wire harness or the protectors 32 for the wire harness are formed by the molding machine 2h and attached to prescribed positions of a main harness to form the wire harness 20. The wire harness 20 is detached from the wiring board 3h by the operator 10h and fed to a process for inspection of an external appearance or a process for inspection of a circuit. Further, as the wire harness 20, various wire harnesses may be manufactured as well as the wire harness of the motor vehicle.

As described above, in the manufacturing device 1 of the wire harness of the present embodiment, the plurality of electric wires 40 are wired in the prescribed forms and the external parts forming the wire harness 20 are formed. Accordingly, in a wire harness factory, only the required number of external parts is manufactured when the external parts are necessary. Therefore, a space for storing the stocks of the external parts is omitted to save a labor and time required for management of the stocks of the external parts.

The above-described embodiments merely show representative forms of the present invention and the present invention is not limited to the embodiments. Namely, the present invention may be modified in various ways within a range which does not deviate from the gist of the present invention.

According to the present invention, in the wire harness manufacturing device, the plurality of electric wires are provided and formed in the prescribed forms and the external parts attached to the wire harness are formed. Accordingly, in a wire harness factory, only the required number of external parts is manufactured when the external parts are necessary. Therefore, a space for storing the stocks of the external parts is omitted to save a labor and time required for management of the stocks of the external parts.

What is claimed is:

1. A wire harness manufacturing method that manufactures a wire harness by a wire harness manufacturing device, wherein the wire harness manufacturing device comprises a molding machine that forms an external part to be attached to the wire harness and a wiring board that wires a plurality of electric wires to a prescribed form, the wire harness manufacturing method comprising:
   forming an external part to be attached to the wire harness by the molding machine;
   wiring a plurality of electric wires to a prescribed form, in the wiring board.

2. The wire harness manufacturing method according to claim 1, further comprising attaching the external part to the wire harness.

3. The wire harness manufacturing method according to claim 1, further comprising integrally forming the external part with an electric wire of the wire harness by the molding machine; and
  wherein the plurality of electric wires along with the electric wire integrally formed with external part are wired to the prescribed form, in the wiring board.

4. The wire harness manufacturing method according to claim 1, wherein
  the wiring board travels on a travel passage, and
  the molding machine is provided along the travel passage.

* * * * *